Patented June 9, 1942

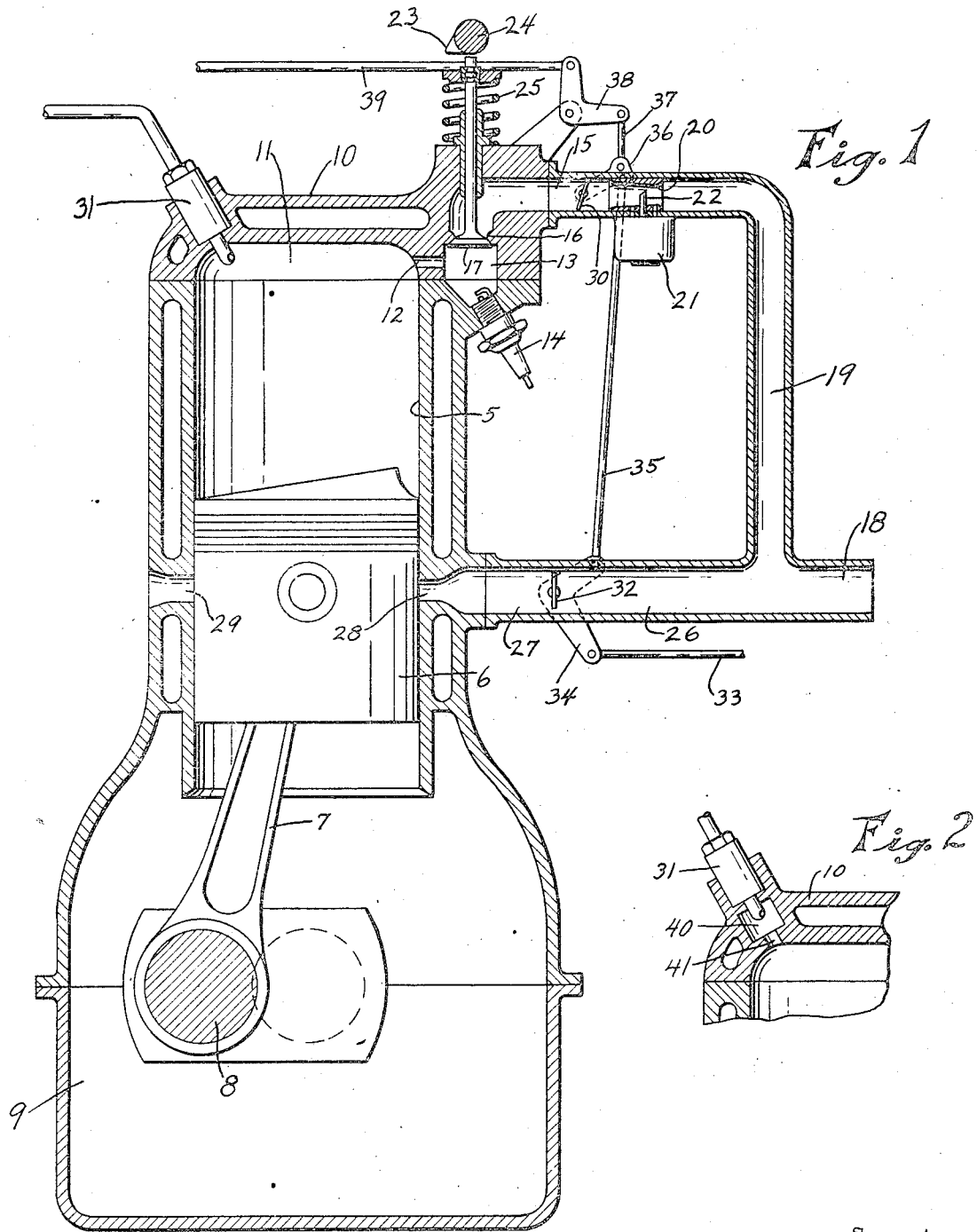

2,285,671

UNITED STATES PATENT OFFICE 2,285,671

INTERNAL COMBUSTION ENGINE

Marion Mallory, Detroit, Mich.

Application January 31, 1941, Serial No. 376,885

2 Claims. (Cl. 123—32)

This invention relates to improvements in an internal combustion engine of the type which includes a primary firing chamber charged with a carburetted mixture which is electrically ignited. This chamber has a restricted communication with the main combustion chamber at the upper end of the cylinder, so that ignition within the primary firing chamber causes a flame to be projected across the main combustion chamber to ignite the charge therein.

The carburetted mixture supplied to the primary firing chamber is alone sufficient for idling the engine, if the cylinder and main combustion chamber are charged only with air. When power is demanded, liquid fuel is injected either into the main combustion chamber or into an auxiliary chamber or pocket having restricted communication therewith. This injection takes place when the piston is near its uppermost position. Variation in power output is effected by varying the quantity of the liquid injected. The carburetted mixture is easily ignitible, while the liquid injected may be fuel oil or other low grade fuel.

The compression developed by this engine may be extremely high, although it is preferably somewhat less than that required when the ignition is effected by compression alone.

The primary object of the invention is to make it possible to operate on this very high compression without detonation, while using a liquid injection of low grade fuel as the main source of power.

It is also an object of the invention to provide a two cycle engine with means for projecting a hot flame across the main combustion chamber to insure complete combustion therein, although it may be filled with a poor or lean mixture containing some residual exhaust gases.

For the purpose of illustration, the invention is shown in the accompanying drawing as applied to a two cycle engine.

In the drawing—

Fig. 1 is a vertical section taken centrally of one of the cylinders and the means for supplying the charges to the primary firing chamber and the main combustion chamber.

Fig. 2 is a fragmentary section, showing a modification of the means for supplying the liquid injection for the main power charge to the cylinder.

The drawing shows a two cycle engine having a cylinder 5 in which a piston 6 is reciprocable. The piston is connected by a connecting rod 7 to a crank shaft 8 operating in the usual manner in a crank case 9. It is to be understood that the engine may have any desired number of cylinders. The cylinder head 10 is formed above the cylinder 5 with a main combustion chamber 11 connected by a restricted port 12 with a primary firing chamber 13, the bottom of which is formed in an extension of the cylinder block and adapted to receive a spark plug 14.

An easily ignitible fuel mixture is supplied to the primary firing chamber 13 from an intake manifold 15 through an inlet port 16 which is controlled by a valve 17. An air intake passage 19 leads to the manifold 15 and is provided with a venturi 20, into which a small carburetor 21 discharges fuel through a nozzle 22. The valve 17 is adapted to be opened by a cam 23 disposed on a cam shaft 24, which is driven at crank shaft speed, and to be closed by a spring 25.

Another air intake passage 26 leads to an air manifold 27, which supplies a charge of pure air to the cylinder 5 through a port 28 located near the lower end of the cylinder. Thus the air intake port 28 is uncovered by the piston 6 toward the end of its downward stroke, shortly after the exhaust port 29 on the opposite side of the cylinder is uncovered.

The volume of the carburetted mixture supplied to the chamber 13 is controlled by a valve 30. When this valve is in idling position, the charge thus supplied is ordinarily sufficient to idle the engine, if the cylinder is charged with air alone. When power is demanded, the air in the cylinder is supplemented near the end of the upward stroke by a charge of liquid fuel from an injector 31.

Air may be supplied under pressure to the passages 19 and 26 from a main conduit 18, which is adapted to be connected to an air pump. The use of an air throttle valve 32 in the passage 26 is optional. Without it, the engine of course operates with substantially constant compression, regardless of the position of the throttle. I have shown the valve 32 as of less diameter than the passage 26. Thus when the throttle is only slightly open, the scavenging is more complete than it would be if the air valve were of the same diameter as the passage in which it operates.

The charge of liquid fuel injected by the injector 31, the charge of carburetted fuel to the primary firing chamber 13 and the amount of air supplied to the cylinder, if the valve 32 is used, are synchronously controlled. As an example of the manner in which this may be done, the throttle control rod 33 is connected to one end of a bell crank 34 secured to the valve 32.

The other end of the bell crank 34 is connected by a link 35 to an arm 36 secured to the valve 30. The arm 36 is also connected by a link 37 and bell crank 38, or other suitable linkage, to a rod 39 which may control the metering of the liquid fuel delivered through the injector 31.

In the modification shown in Fig. 2, the liquid fuel injector 31 is mounted in a pocket 40, which has a restricted communication 41 with the main combustion chamber 11, so that the liquid fuel is partially mixed with air and partially vaporized before entering the main combustion chamber, where it comes into contact with the flame projected from the primary firing chamber 13.

In the operation of this engine, as the piston approaches the lower end of its stroke, the exhaust port 29 and then the air intake port 28 are uncovered and air blown into the cylinder through the port 28 drives out the exhaust gases. When power is demanded, the throttle operating rod 33 is progressively moved toward the left, as viewed in Fig. 1, the valves 17 and 32 are opened in synchronism, and at the same time progressively increasing charges of liquid fuel are supplied to the cylinder through the injector 31.

The valve 17 is opened for a period long enough to permit the chamber 13 to become substantially filled with the carburetted mixture blown in through the port 16 but not to overflow into the main combustion chamber. The volume of air entering the cylinder through the port 28 and the volume of mixture entering the primary firing chamber through the port 16 are so controlled that the pressures are balanced as nearly as possible, so that there is little, if any, commingling between the chambers 11 and 13 prior to ignition, although the restricted port 12 remains constant. The throttle valves 30 and 32 open and close in synchronism, so that the balanced pressures are maintained for all positions of the throttle.

As stated above, when the throttle is in idling position, the charge supplied to the chamber 13 is sufficient to idle the engine, without any liquid injection from the injector 31. When the throttle is opened, the liquid fuel injection takes place when the piston is near the upper end of its stroke. As the spark occurs, the flame from the ignition of the carburetted mixture in the chamber 13 surges through the restriction 12 and across the main combustion chamber, causing almost instantaneous combustion in the latter. Owing to this very rapid combustion, the spark may be timed much later than in the conventional engine. At the time when the effect of the explosion is realized, the piston will be traveling downwardly, the volume of the combustion chamber will be expanding and no detonation will occur.

In the usual spark ignited high compression engine, as the flame front advances from the spark plug, an abnormally high pressure is built up in front of the flame and this is often sufficient to cause self-ignition by compression, which causes detonation. This is avoided in my engine, because the flame surging at a high velocity from the restriction 12 sets up an intense turbulence which almost immediately brings about a substantially homogeneous mixture in the cylinder, and this results in a uniform, complete and almost instantaneous combustion throughout the expanding combustion chamber, without detonation.

The timing of the liquid fuel injection will depend to some extent upon the compression. If extremely high compression is used, the injection will be timed to start when the piston is near its upper dead center position and continues for a length of time which is varied according to the power demand. That is, the injection continues until the piston has moved downwardly from its uppermost position. If a lower compression is used, the injection is completed when the piston is near its uppermost position and power is increased by advancing the time at which the injection starts.

In the modification shown in Fig. 2, where the liquid fuel charge is injected into the pocket 40, it becomes partly mixed with air in the pocket before it is discharged into the main combustion chamber. This tends to improve the atomization of the mixture before combustion occurs.

It is to be understood that the proposed construction of the invention, as herein explained, is merely illustrative and that the invention also includes such other modifications as may be embraced within the scope of the appended claims.

I claim:

1. A two cycle internal combustion engine comprising a cylinder having a main combustion chamber at its upper end, a piston reciprocable in said cylinder, a primary firing chamber having a constant restricted communication with the main combustion chamber, said cylinder having an exhaust port and an air intake port successively uncovered by the piston near the end of its downward stroke, means for supplying air under pressure to said intake port and for supplying to the primary firing chamber a charge of carburetted mixture which alone is sufficient for idling the engine, means including a liquid fuel injector for supplying a charge to the main combustion chamber when power is demanded, interconnected means to increase the supply of carburetted mixture to the primary firing chamber and the supply of air through said air intake port in such proportion as to insure a substantially balanced pressure between the primary firing chamber and the cylinder, thereby minimizing flow therebetween prior to ignition, and electrical means for igniting the carburetted charge in the primary firing chamber and by the explosion thereof projecting a flame across the main combustion chamber to cause combustion of the charge therein.

2. A two cycle internal combustion engine comprising a cylinder having a main combustion chamber at its upper end, a primary firing chamber having a constant restricted communication with the main combustion chamber, means for supplying under pressure a charge of air to the cylinder and a charge of carburetted mixture to the primary firing chamber, interconnected throttling means to limit the volumes of the two charges to such proportion that there is a substantially balanced pressure between the primary firing chamber and the cylinder to prevent the charges therein from commingling prior to ignition, means including a liquid fuel injector to supply a power charge to the main combustion chamber, and electrical means for igniting the carburetted mixture in the primary firing chamber and by the explosion thereof projecting a flame across the main combustion chamber to cause combustion of the charge in the latter.

MARION MALLORY.